United States Patent [19]
Anthony et al.

[11] Patent Number: 6,017,087
[45] Date of Patent: Jan. 25, 2000

[54] CHILD RESTRAINT WITH A ROTARY COUPLING

[75] Inventors: James T. Anthony, Noblesville; Harold L. Forth, Fortville, both of Ind.

[73] Assignee: Indiana Mills and Manufacturing, Inc., Westfield, Ind.

[21] Appl. No.: 09/135,908

[22] Filed: Aug. 18, 1998

[51] Int. Cl.[7] ................................................ B60N 2/28
[52] U.S. Cl. ................. 297/250.1; 297/253; 297/256.16; 403/349
[58] Field of Search .............................. 24/596, 597, 632, 24/637; 403/349, 348; 297/250.1, 256.16, 253

[56] References Cited

U.S. PATENT DOCUMENTS

| | | | |
|---|---|---|---|
| 3,540,091 | 11/1970 | Marosy | 24/597 X |
| 5,487,588 | 1/1996 | Burleigh et al. | 297/250.1 |
| 5,669,663 | 9/1997 | Feuerherdt | 297/250.1 |
| 5,890,762 | 4/1999 | Yoshida | 297/256.16 |

FOREIGN PATENT DOCUMENTS

| 619201 | 10/1994 | European Pat. Off. | 297/250.1 |
|---|---|---|---|

OTHER PUBLICATIONS

Internet Catalog, *DFS International, Inc.,* pp. 1–20.

*Primary Examiner*—Peter M. Cuomo
*Assistant Examiner*—Anthony D. Barfield
*Attorney, Agent, or Firm*—Woodard, Emhardt, Naughton, Moriarty & McNett

[57] ABSTRACT

A rotary coupling to attach an infant seat to the passenger seat of a vehicle. This invention is a child-restraining device for mounting in the passenger seat of a vehicle that has at least one rigid member fixedly mounted in the bite between the passenger seat's seat portion and back portion. In particular, the child-restraining device of this invention has a child seat and at least one rotary coupling to attach the child seat to the rigid member. The rotary coupling is characterized by: a rigid hollow cylinder with two notches in one end, a piston that slides back and forth inside the cylinder, a spring to push the piston toward the notches; a means to prevent the piston from sliding out of the cylinder, and a means to attach the rotary coupling to the child seat. The coupling is operated by pushing the piston back within the cylinder and placing the rigid member in the cylinder's notches. Once in the notches, the piston is released and the spring exerts a force that holds the rigid member between the piston and the notches. The coupling can then be released by again pulling back the piston and removing the rigid member from the notches.

20 Claims, 9 Drawing Sheets

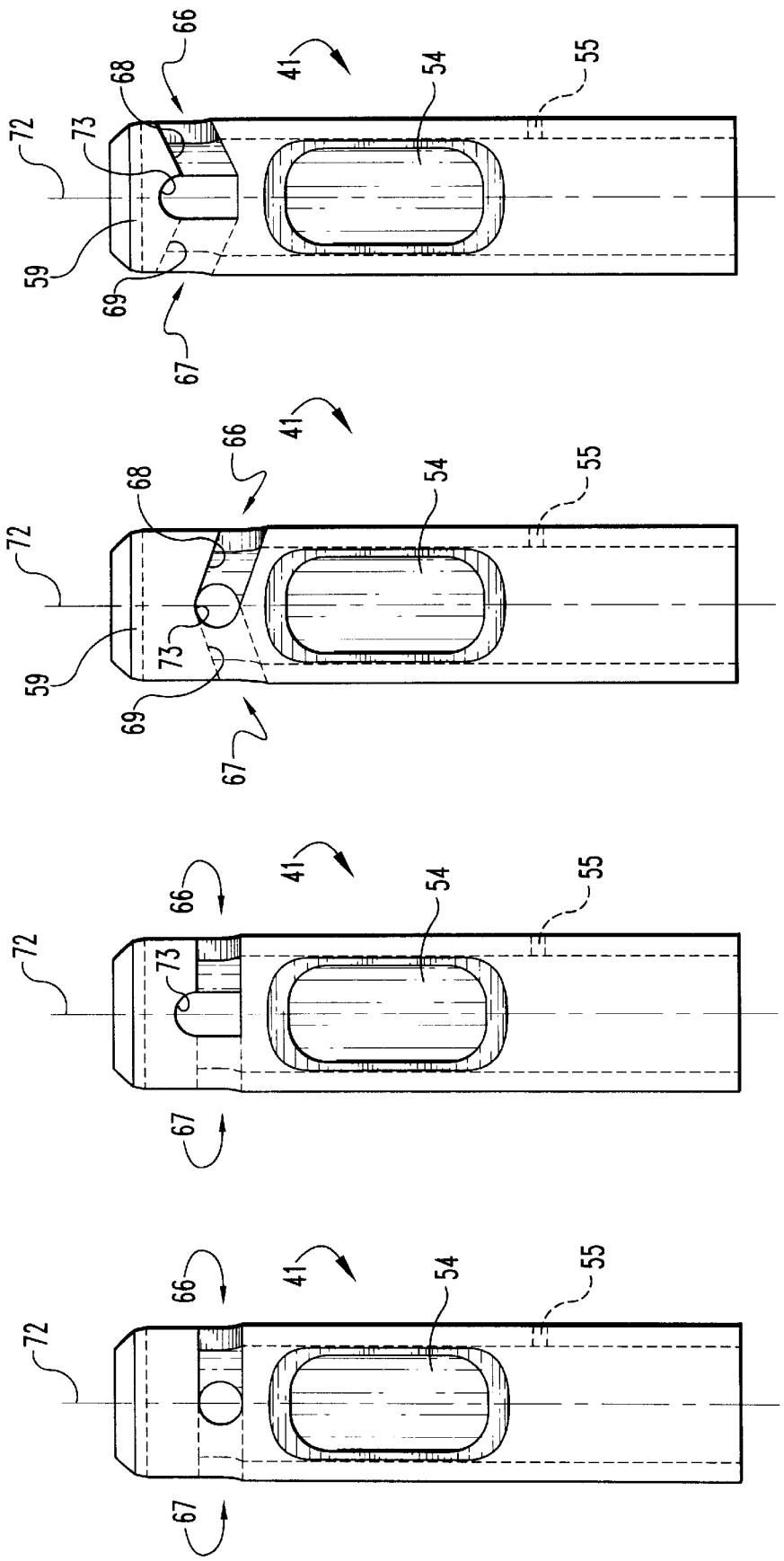

6,017,087

CHILD RESTRAINT WITH A ROTARY COUPLING

BACKGROUND OF THE INVENTION

Often when small children ride in an automobile, they are placed in a child seat, which is placed upon the seat of the automobile. The child seat normally includes a set of seat belts, which secure the child. The child seat is, in turn, normally secured to the automobile in some fashion utilizing the seat belts, which are permanently attached inside the vehicle. But the standard seat belts for an automobile are designed to secure an adult to the seat of an automobile, rather than a child seat. Consequently, the child seat must be deigned to accommodate being secured to the automobile with any of several different types of restraining means available in differing automobiles. These include but are not limited to lap belts, shoulder belts, combined lap and shoulder belts, and the like.

Accordingly, what is needed is a child seat that is designed to integrate directly to fastening devices mounted to the passenger seat that are separate from the normal passenger restraint system. One answer to this need can be found in commonly owned U.S. Pat. No. 5,695,243 to Anthony et al., the disclosure of which is specifically incorporated into this specification by reference. The present invention is another answer.

SUMMARY OF THE INVENTION

In one aspect, this invention is a child-restraining device for mounting in the passenger seat of a vehicle that has at least one rigid member fixedly mounted in the bite between the passenger seat's seat portion and back portion. In particular, the child-restraining device of this invention has a child seat and at least one rotary coupling to attach the child seat to the rigid member. The rotary coupling is characterized by: a rigid hollow cylinder with two notches in one end, a piston that slides back and forth inside the cylinder, a spring to push the piston toward the notches; a means to prevent the piston from sliding out of the cylinder, and a means to attach the rotary coupling to the child seat.

The coupling is operated by pushing the piston back within the cylinder and placing the rigid member in the cylinder's notches. Once in the notches, the piston is released and the spring exerts a force that holds the rigid member between the piston and the notches. The coupling can then be released by pulling the piston back inside the cylinder and removing the rigid member from the notches.

In another aspect, this invention is also a child-restraining device for mounting in the passenger seat of a vehicle that has at least two rigid members fixedly mounted in the bite between the passenger seat's seat portion and back portion. In particular, the child-restraining device of this invention has a child seat and at least two rotary couplings to attach the child seat to the rigid members. Each rotary coupling is characterized by: a rigid hollow cylinder with two notches in one end, a piston that slides back and forth inside the cylinder, a spring to push the piston toward the notches; a means to prevent the piston from sliding out of the cylinder, a belt or web that is connected between each rotary coupling and the seat, and a means to tighten the belt or web once the rotary couplings are engaged with the rigid members in the passenger seat.

In still another aspect, this invention is also a child-restraining device for mounting in the passenger seat of a vehicle that has at least two rigid members fixedly mounted in the bite between the passenger seat's seat portion and back portion. In particular, the child-restraining device of this invention has a rigid platform, a child seat mounted to the rigid platform, at least two rotary couplings to attach the rigid platform to the rigid members, a means for securing the rotary couplings to the rigid platform, and a means to twist the rotary couplings. Each rotary coupling is characterized by a rigid hollow cylinder with two notches in one end, a piston that slides back and forth inside the cylinder, a spring to push the piston toward the notches; and a means to prevent the piston from sliding out of the cylinder.

It is an object of this invention to provide a new and improved child seat.

A further object of this invention is to provide a new and improved mounting arrangement for securing a child seat to the passenger seat of a vehicle.

BRIEF DESCRIPTION OF THE DRAWINGS

FIGS. 8, 9, 10, and 11 are plan views alternative embodiments of a cylinder that may be used in a rotary coupling according to the present invention.

DESCRIPTION OF THE PREFERRED EMBODIMENTS

Figure 1:
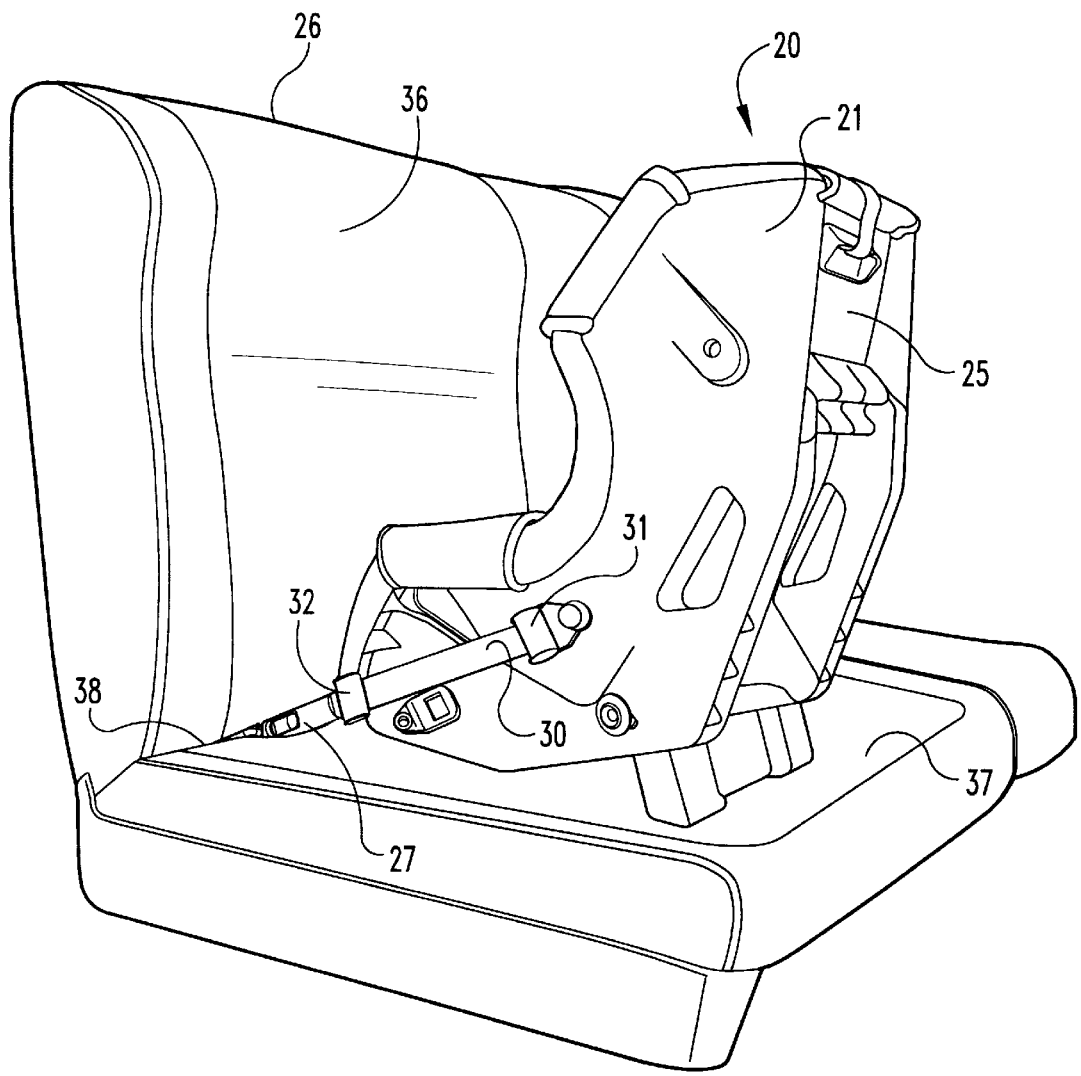
FIG. 1 is a perspective view of a passenger seat and a rearwardly facing child seat incorporating one embodiment of the present invention.

For the purpose of promoting an understanding of the principles of this invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein are contemplated as would normally occur to one of average skill in the art to which the invention relates.

Referring to FIG. 1, child's infant seat 20 is shown placed on top of automobile seat 26. Seat 20 includes a plastic main body 21 that is molded to receive a child in the sitting position. The seat portion is generally concave in configuration and is integrally joined to back portion 25. For the child's comfort, a flexible and washable cushion preferably resides over both the seat and back portions.

Seat 20 is coupled by one, or alternatively at least two, rotary coupling(s) 27 to passenger seat 26 with a separate web or belt 30 tying or securing each coupling to seat 20. For clarity, only one rotary coupling 27 is shown in FIG. 1. However, a second coupling, similar to the one that is shown, can be mounted on the other side of seat 20. The proximal end of web 30 includes a conventional web adjuster 31 that is mounted, optionally with a pivot, to seat 20. An example of such a web adjuster is described in U.S. Pat. No. 4,660,889 to Anthony et al., U.S. Pat. No. 5,031,962 to Lee, or U.S. Pat. No. 4,876,770 to Bougher, the disclosures of which are specifically incorporated into the specification by reference. The distal end of web or belt 30 is then attached to the proximal end of rotary coupling 27 in any conventional manner, such as with pins, rivets, stitching, or another web adjuster 32. If web adjuster 32 is used, one may omit web adjuster 31 and mount the proximal end of web 30 directly to seat 20. Upon attachment to seat 20, web adjuster 31 may then be used to adjust the tension or tightness of web 30 when seat 20 is attached to passenger seat 26.

Figure 3:
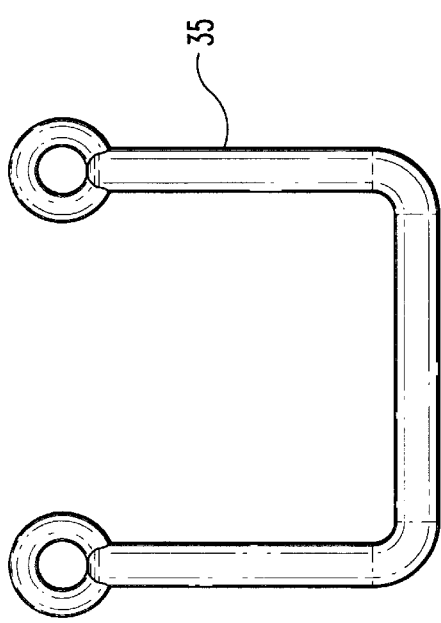
FIG. 3 is a plan view of a fixedly mountable rigid member.
Figure 2:
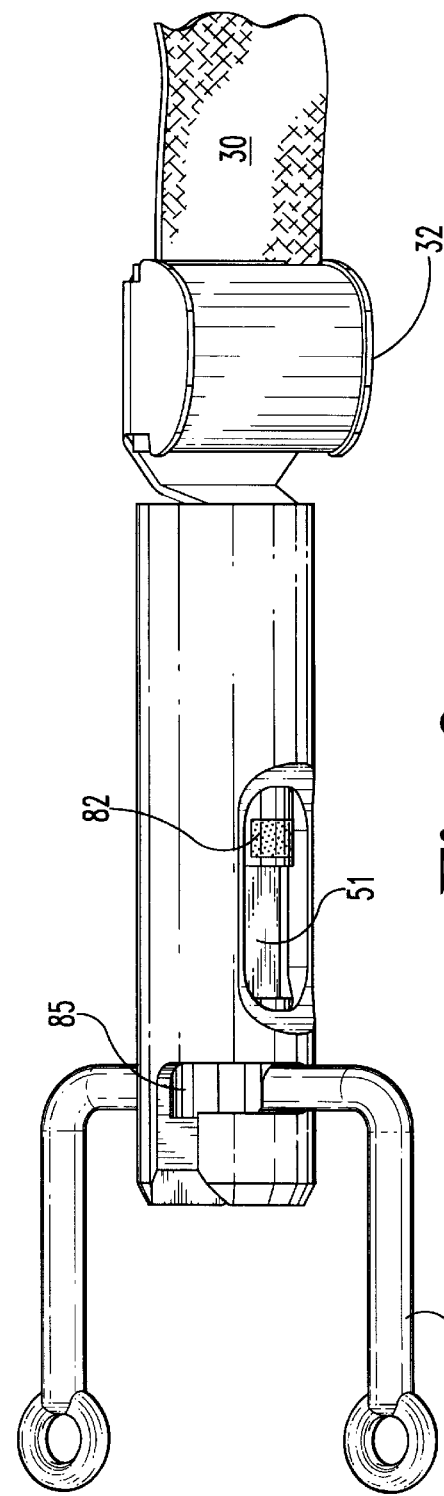
FIG. 2 is an enlarged perspective view of a rotary coupling attached to a fixedly mounted rigid member according to one embodiment of the present invention.

A closer view of rotary coupling 27 engaged to a fixedly mountable rigid member 35 is shown in FIG. 2. Referring back to FIG. 1, fixedly mountable rigid member 35 (not shown) can be mounted in most any conventional manner to passenger seat 26 in bite 38 between back support 36 and seat support 37. In general, at least one rigid member 35 is mounted in seat bite 38 for every rotary coupling 27 that is used to attach infant seat 20 to passenger seat 26, generally one on each side of seat 20. And referring to FIG. 3, rigid member 35 is typically round in cross-section of which one example is an Anchorage World Universal 6-millimeter bar.

Figure 4:
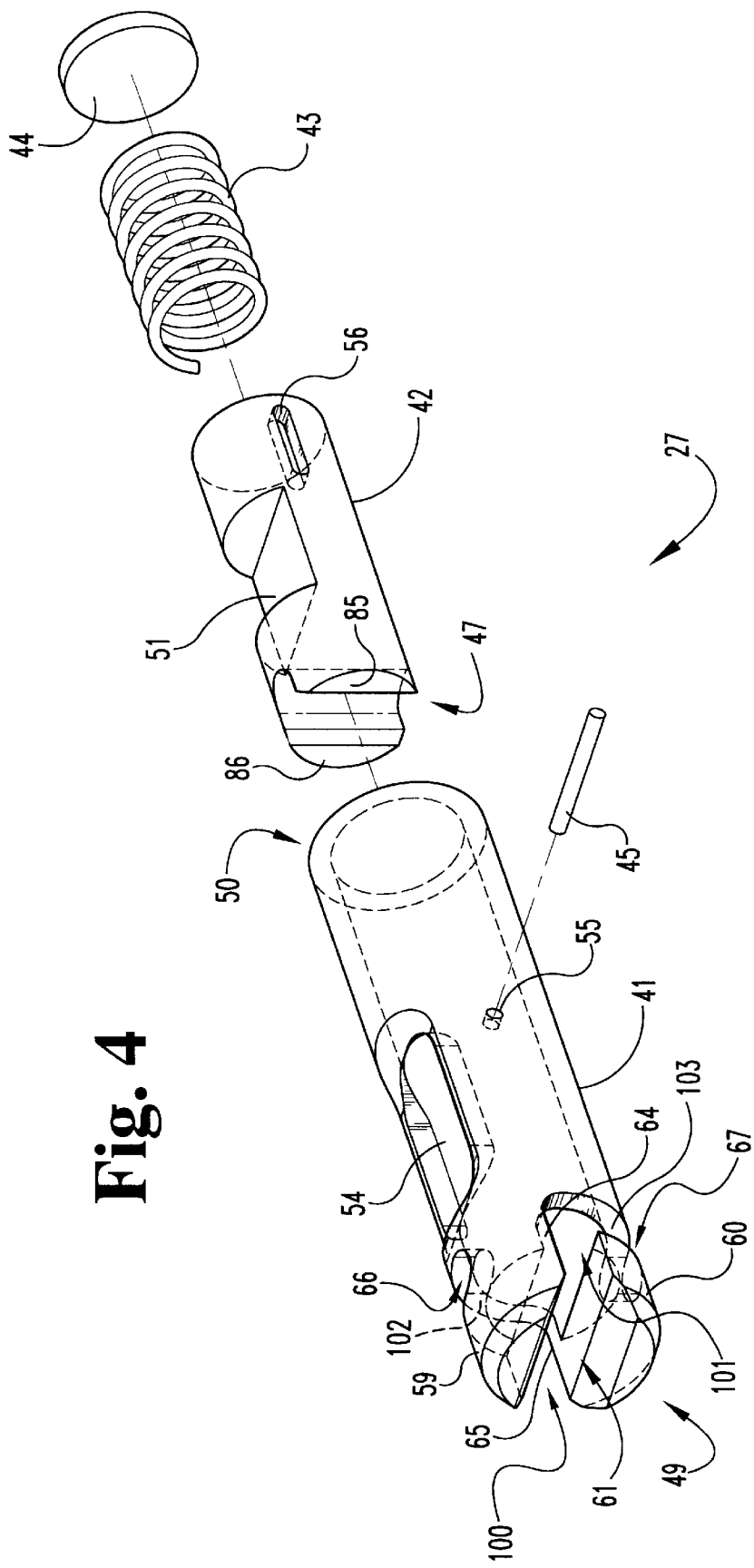
FIG. 4 is an exploded view of a rotary coupling according to one embodiment of the present invention.

An exploded view of rotary coupling 27 is presented in FIG. 4. Rotary coupling 27 generally includes rigid hollow cylinder 41, piston 42, spring 43, end 44, and pin 45. Rotary coupling 27 is assembled by sliding piston 42, external end 47 first, inside rigid hollow cylinder 41. Once inside, piston 42 has sufficient clearance to allow it to reciprocally slide inside rigid hollow cylinder 41, between distal end 49 and proximal end 50. Piston 42 further includes a finger groove 51, which is aligned with access opening 54 and which is adapted to receive a human finger. Finger groove 51 is then maintained in alignment with access opening 54 by pin 45 that extends through hole 55 and into guide groove 56. A spring 43 or other biasing means is then placed behind piston 42 to urge piston 42 toward the distal end 49. Thereafter, end 44 is placed behind spring 43 to hold both spring 43 and piston 42 in position. End 44 can be attached to rigid hollow cylinder 41 in most any conventional fashion, for example, as by welding end 44 to cylinder 41.

Optionally and once the rotary coupling is assembled, a raised button (not shown) adapted to receive a human finger can be attached to piston 42 through access opening 54, over finger groove 51. The raised button can then be used to both manually slide piston 42 inside cylinder 41 and maintain piston 42 in alignment with rigid cylinder 42 by sliding against the sides of access opening 54. Accordingly if the raised button is present, one may omit pin 45 and alignment groove 56 from the rotary coupling shown in FIG. 4.

Figure 5:
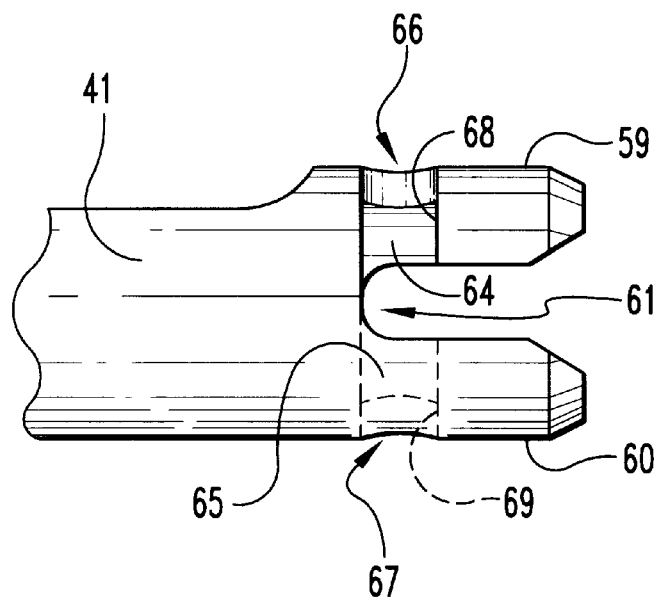
FIG. 5 is a side view of the distal end of a rotary coupling according to one embodiment of the present invention.
Figure 6:
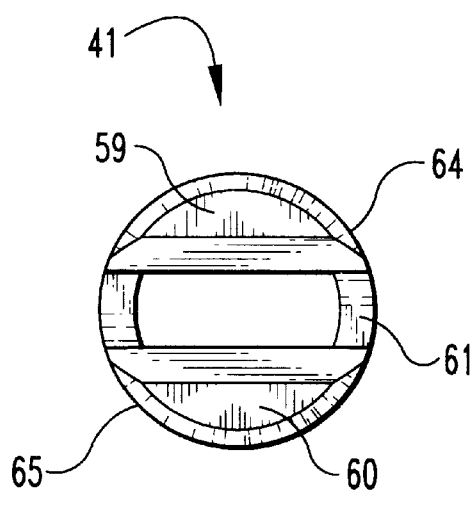
FIG. 6 is an end view of the distal end of a rotary coupling according to one embodiment of the present invention.

A side view of distal end 49 on rigid hollow cylinder 41 is presented in FIG. 5 and an end view of distal end 49 is presented in FIG. 6. Simultaneously viewing these figures and FIG. 4, two fingers, 59 and 60, are laterally attached by their opposite proximal ends, 64 and 65, across the open end 61 of cylinder 41. Fingers 59 and 60 are attached slightly spaced from open end 61, which forms notches, 66 and 67, between the proximal edge of each finger, 68 and 69, and open end 61. Notches 66 and 67 are mutually opposed and include respectively slots 100 and 101 extending in the direction of the longitudinal axis of cylinder 41. Slots 100 and 101 open respectively into slots 102 and 103 extending around the cylinder's longitudinal axis. As presented below, fingers 59 and 60 and notches 66 and 67, are generally used to attach the rotary coupling to fixedly mounted member 35. However, if fingers 59 and 60 are optionally mounted over open end 61 as shown, fingers 59 or 60 can also serve to hold piston 42 inside a the rotary coupling when the coupling is not engaged to a fixedly mounted member 35 since the wall thickness 104 of fingers 59 and 60 is greater than the wall thickness of cylinder 41.

Figure 7:
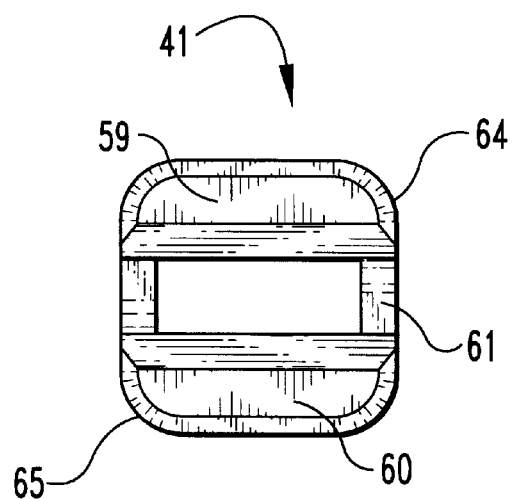
FIG. 7 is an end view of the distal end of a rotary coupling according to one embodiment of the present invention.

FIG. 7 presents an alternative embodiment of rigid hollow cylinder 41. Besides the circular cross-section shown in FIG. 6, cylinder 41 and piston 42 may also be generally square, as shown, as well as have other non-circular cross-sections such as hexagonal, octagonal, or even oval. And should the practitioner choose a non-circular cross-section, the practitioner may again remove pin 45 and groove 56 from coupling 27. Being non-circular, the mating sides of cylinder 41 and a complementarily shaped piston 42 may be used to maintain cylinder 41 and piston 42 in proper alignment.

FIG. 8 presents a plan view of rigid hollow cylinder 41 as shown in previous figures with notches 66 and 67 that are generally perpendicular to longitudinal axis 72. However besides perpendicular, the notches may also take other forms. For example and referring to FIG. 9, notches 66 and 67 may also include a seat 73 that is adapted to receive rigid member 35, when rotary coupling 27 is engaged to rigid member 35. Or referring to FIGS. 10 and 11, the proximal edges, 68 and 69, of fingers 59 and 60 may also be oriented at an oblique angle to longitudinal axis 72, which similarly offers a seat 73 against which rigid member 35 may reside.

Figure 12:
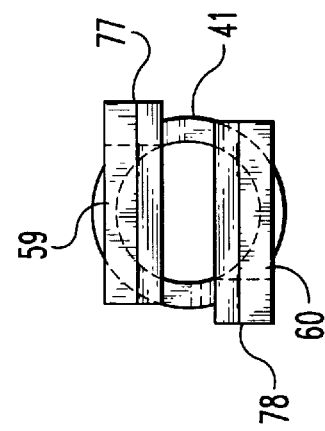
FIGS. 12, 13, and 14 are respectively end, side, and top view of one embodiment of the present invention.
Figure 14:
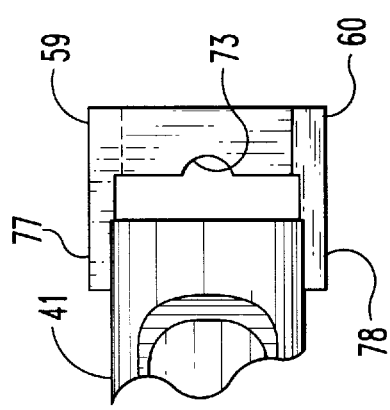
Figure 13:
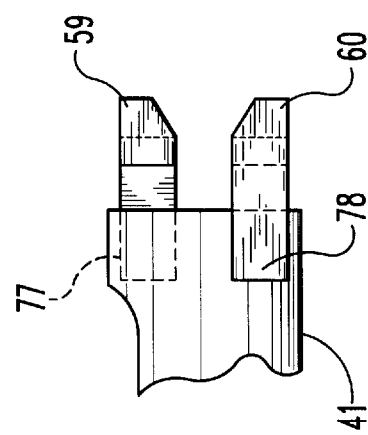

Referring now to FIGS. 12, 13, and 14 there is shown an alternative embodiment to attaching fingers 59 and 60 to rigid hollow cylinder 41. In previous figures, fingers 59 and 60 were presented contiguous to rigid hollow cylinder 41; that is, fingers 59 and 60 were shown cut or molded into the same piece of material as cylinder 41. Alternatively, fingers 59 and 60 may start as separate pieces and then be attached to rigid hollow cylinder 41 in any conventional manner such as welding legs 77 and 78, which are attached to fingers 59 and 60, to opposite sides of cylinder 41.

Figure 15:
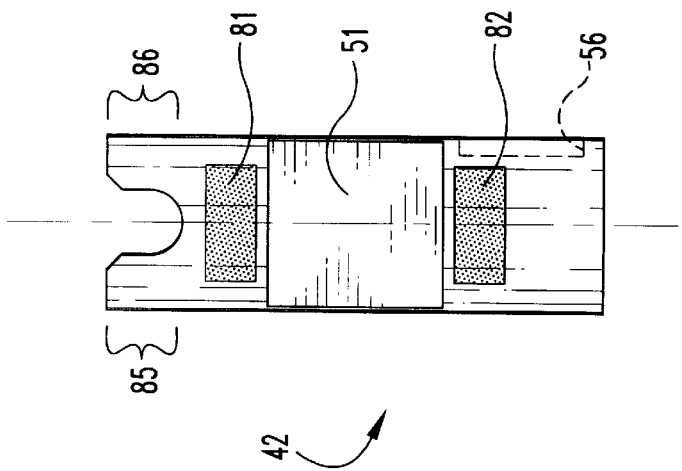
Figure 18:
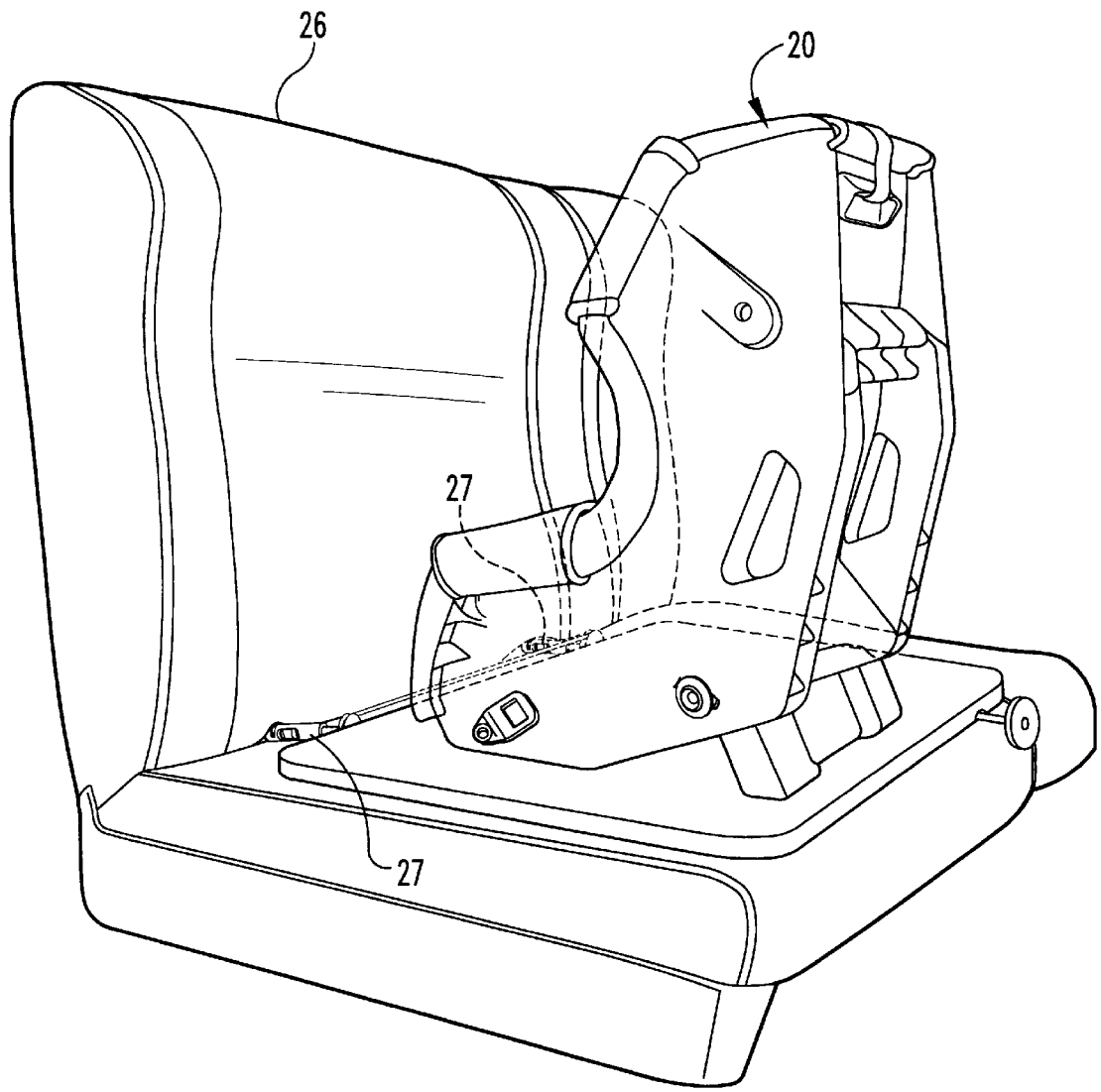
FIG. 18 is a perspective view of a passenger seat and a rearwardly facing child seat incorporating one embodiment of the present invention.

A plan view of piston 42 is presented in FIG. 15. Piston 42 optionally includes an indicator to inform the user when the piston is either proximally or distally displaced within rigid hollow cylinder 41. The indicator is provided by colored portions 81 and 82 located on piston 42. When proximally displaced, colored portion 81 is readily visible through access opening 54 and colored portion 82 is hidden under rigid hollow cylinder 41. Then when piston 42 is distally displaced, colored portion 82 becomes readily visible, and colored portion 81 becomes hidden. In this regard, it is contemplated that colored portions 81 and 82 have different colors to allow the user to know at a glance what position piston 42 resides.

Figure 17:
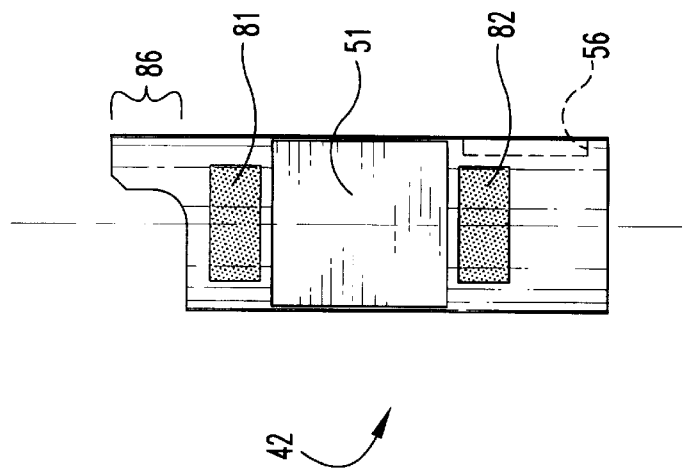
FIGS. 15, 16, and 17 are plan views of alternative embodiments of a piston that may be used in a rotary coupling according to the present invention.
Figure 16:
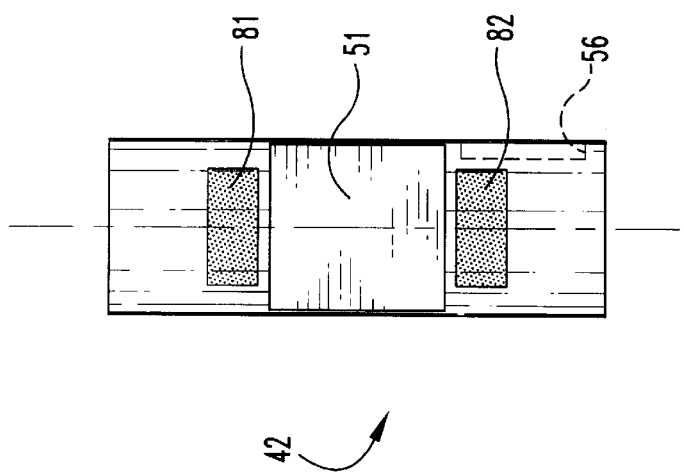

Still referring to FIG. 15, piston 42 optionally includes two pawl blocks, 85 and 86. Pawl blocks 85 and 86 are extensions of piston 42 forming a groove to contact rigid member 35. When coupling 27 is rotated, as described more fully below, member 35 is positioned within slots 102 and 103, and the groove contacts rigid member 35. With rotary coupling 27 and rigid member 35 thusly engaged, pawl blocks 85 and 86 reside on either side of member 35 and prevent member 35 from sliding out of either notch 66 or 67. FIG. 16 shows an alternative embodiment of the piston 42 that omits the pawl blocks, and FIG. 17 presents yet another alternative embodiment where only one pawl block, 86, is present.

Rotary coupling 27 is engaged to rigid member 35 by first placing rigid member 35 between fingers 59 and 60 and then pushing rotary coupling 27 against rigid member 35 until rigid member 35 becomes aligned with slots 102 and 103 of notches 66 and 67. This movement pushes piston 42 to a proximal position inside cylinder 41 and compresses spring 43. Once rigid member 35 is aligned with slots 102 and 103 of notches 66 and 67, the rotary coupling is twisted about its axis to place fixedly mounted rigid member 35 within slots 102 and 103 and then the coupling is released. With the coupling released, spring 43 decompresses and presses piston 42 against rigid member 35, which holds rigid member 35 within rotary coupling 27.

Rotary coupling 27 is then released from rigid member 35 by first accessing piston 42 through access opening 54 with a human finger. Once the human finger is located at groove 51, piston 42 can be pulled back to a proximal position within cylinder 41. With piston 42 located in a proximal position, spring 43 is recompressed and the spring's force against rigid member 35 is released. With the force released, rotary coupling 27 is then twisted around its longitudinal axis in a direction that is opposite of that which was previously used to engage coupling 27 and member 35. Rotary coupling 27 is then twisted until rigid member 35 exits slots 102 and 103 and is aligned with slots 100 and 101. Rigid member 35 is then slid past fingers 59 and 60, and out of out of rotary coupling 27.

Figure 19:
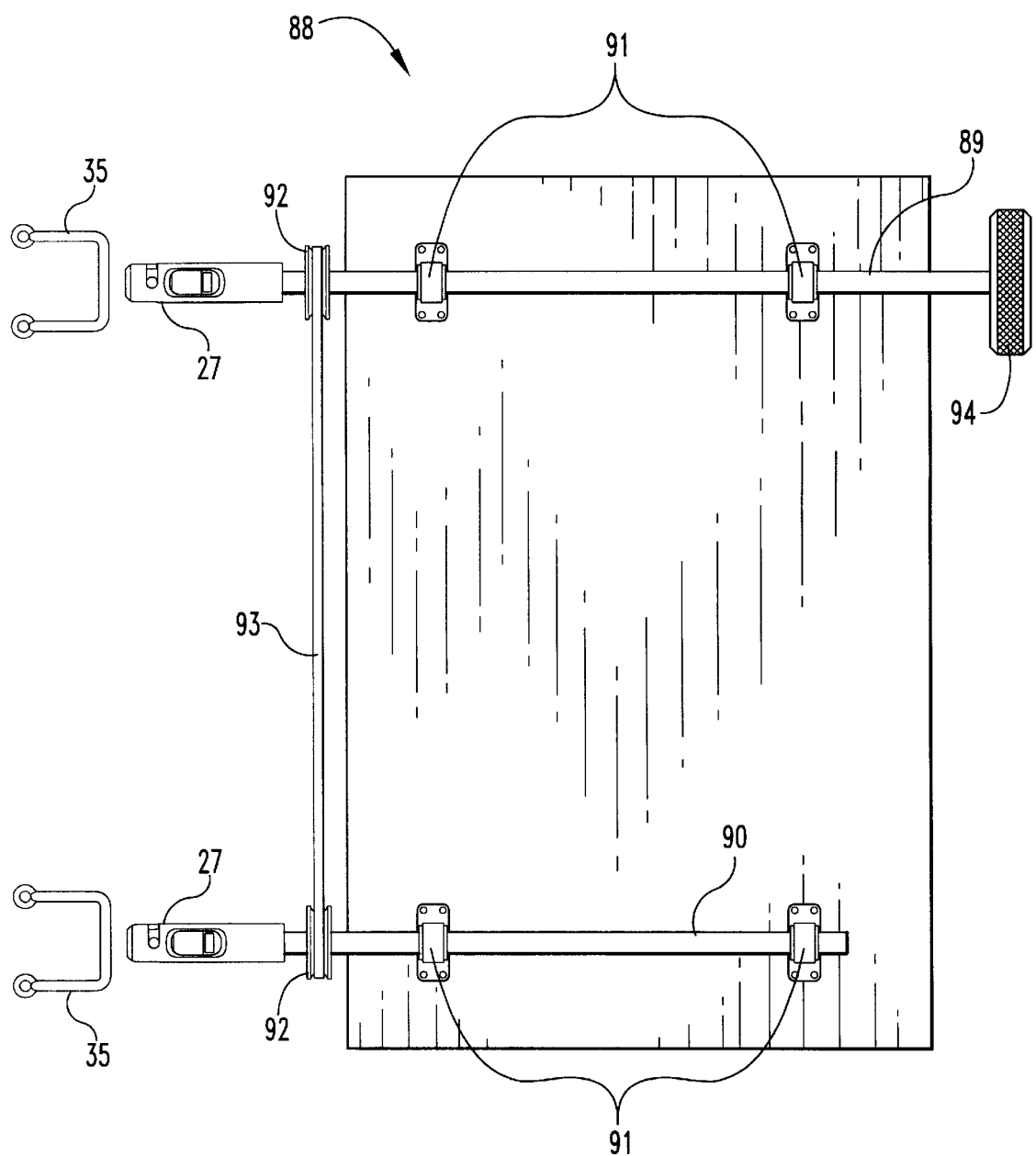
FIG. 19 is a plan view of a rigid plate according to one embodiment of the present invention.

Referring to FIG. 19, another embodiment of this invention is presented with infant seat 20 mounted in most any conventional manner atop rigid platform 88. The platform, rather than the seat, is then attached to passenger seat 26 by rotary couplings 27. Referring to FIG. 19, rigid platform 88 has two shafts, 89 and 90, which are rotatably attached through bearings 91 to platform 88. Shafts 89 and 90 each include a pulley or gear 92 that are mutually connected by a belt or chain 93. A rotary coupling, 27, is then mounted to the distal end of each shaft. Arranged in this fashion, both couplings can then be simultaneously twisted around their longitudinal axis by turning knob 94.

This latter embodiment is operated by aligning each rotary coupling 27 with a rigid member 35 that was previously mounted in the bite of a passenger seat. Each rigid member is then pushed between the fingers in each rotary coupling, which simultaneously pushes each piston 42 to a proximal position inside the coupling. The rigid members are pushed past the fingers until each rigid member aligns with the notches in its rotary coupling. Then once aligned, both rotary couplings are simultaneously twisted around each rigid member 35 by turning knob 94. Piston 42 and spring 43 in each rotary coupling then hold each rigid member 35 within notches 66 and 67, which in turn, securely holds the infant seat in the passenger seat of a vehicle. Optionally, belt 93 and pulleys 92 can be omitted from this embodiment and each shaft can be operated by a separate knob.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A child restraining device for mounting in a passenger seat of a vehicle having at least one fixedly mounted rigid member, comprising:
   a child seat having a seat support upon which the child may sit and back support against which the child may rest;
   at least one rotary coupling, said rotary coupling including:
      (a) a rigid hollow cylinder having a first open end, a second end, an access opening, and a longitudinal axis;
      (b) two laterally and oppositely disposed fingers each having a proximal edge, each finger fixedly attached to the first open end of said cylinder and forming a notch between the proximal edge of the finger and the first open end of said rigid hollow cylinder, said notch having a proximal edge;
      (c) a piston reciprocably and slidably received within said rigid hollow cylinder between a proximal position away from said fingers and a distal position toward said fingers, said piston having an external end;
      (d) means for biasing said piston toward the distal position; and
      (e) means for preventing said piston from sliding past the distal position; and
   means for securing said rotary coupling to said child seat;
   whereby the rotary coupling of the child restraining device may be releasably engaged with the fixedly mounted rigid member of a vehicle by pushing the fixedly mounted rigid member between the fingers of said rotary coupling, by sliding the piston of said rotary coupling toward the proximal position until the fixedly mounted rigid member is aligned with the notches in said rotary coupling, and by twisting said rotary coupling around its longitudinal axis to place the fixedly mounted rigid member within the notches of said rotary coupling.

2. The child restraining device of claim 1, where the external end of said piston includes at least one pawl block that prevents said rigid member from leaving at least one of the notches in said rotary coupling when said rotary coupling is releasably engaged with the rigid member in a passenger seat.

3. The child restraining device of claim 1, where said piston includes a portion having a first color that is visible when said piston is placed in the distal position.

4. The child restraining device of claim 1, where said piston includes a portion having a second color that is visible when said piston is placed in the proximal position.

5. The child restraining device of claim 1, wherein said rigid hollow cylinder has a round cross section.

6. The child restraining device of claim 1, wherein said rigid hollow cylinder has a square cross section.

7. The child restraining device of claim 1, wherein said fingers are contiguous to said rigid hollow cylinder.

8. The child restraining device of claim 1, wherein the notch between said fingers and said rigid hollow cylinder includes a seat that is adapted to receive the rigid member.

9. The child restraining device of claim 1, wherein the proximal edge of the notch in said rigid hollow cylinder is perpendicular to the longitudinal axis of said rigid hollow cylinder.

10. The child restraining device of claim 1, wherein the proximal edge of the notch in said rigid hollow cylinder is oblique to the longitudinal axis of said rigid hollow cylinder.

11. The child restraining device of claim 1, wherein the biasing means is a spring.

12. The child restraining device of claim 1, including at least two of said rotary couplings.

13. The child restraining device of claim 1, including means for adjusting the tightness of said means for securing.

14. The child restraining device of claim 13, wherein the rigid hollow cylinder has a round cross section.

15. A child restraining device for mounting in a passenger seat of a vehicle having at least two fixedly mounted rigid members, comprising:
   a child seat having a seat support upon which the child may sit and back support against which the child may rest;
   at least two rotary couplings, each of said rotary couplings including:
      (a) a rigid hollow cylinder having a first open end, a second end, an access opening, and a longitudinal axis;
      (b) two laterally and oppositely disposed fingers each having a proximal edge, each finger fixedly attached to the first open end of said cylinder and forming a notch between the proximal edge of the finger and the first open end of said rigid hollow cylinder;
      (c) a piston reciprocably and slidably received within said rigid hollow cylinder between a proximal position away from said fingers and a distal position toward said fingers, said piston having an external end;
      (d) means for biasing said piston toward the distal position; and
      (e) means for preventing said piston from sliding past the distal position;
   a belt connected between each of said rotary couplings and said child seat; and
   means for adjusting the tightness of said belt between each of said rotary couplings and said child seat;
   whereby each rotary coupling of the child restraining device may be releasably engaged with a fixedly mounted rigid member of a vehicle by pushing the fixedly mounted rigid member between the fingers of said rotary coupling, by sliding the piston of said rotary coupling toward the proximal position until the fixedly mounted rigid member is aligned with the notches in said rotary coupling, and by twisting said rotary coupling around its longitudinal axis to place the fixedly mounted rigid member within the notches of said rotary coupling.

16. The child restraining device of claim 15, where the external end of said piston in each of said rotary couplings includes at least one pawl block that prevents the rigid member from leaving at least one of the notches in said rotary coupling when said rotary coupling is releasably engaged with the rigid member.

17. A child restraining device for mounting in a passenger seat of a vehicle having at least two fixedly mounted rigid members, comprising:
   a rigid platform;
   a child seat fixedly attached to said rigid platform, said child seat having a seat support upon which the child may sit and back support against which the child may rest;
   at least two rotary couplings, each of said rotary couplings including:
      (a) a rigid hollow cylinder having a first open end, a second end, an access opening, and a longitudinal axis;
      (b) two laterally and oppositely disposed fingers each having a proximal edge, each finger fixedly attached to the first open end of said cylinder and forming a notch between the proximal edge of the finger and the first open end of said rigid hollow cylinder;
      (c) a piston reciprocably and slidably received within said rigid hollow cylinder between a proximal position away from said fingers and a distal position toward said fingers, said piston having an external end;
      (d) means for biasing said piston toward the distal position; and
      (e) means for preventing said piston from sliding past the distal position;
   means for securing said rotary couplings to said rigid platform; and
   means for twisting said rotary couplings;
   whereby each rotary coupling of the child restraining device may be releasably engaged with a fixedly mounted rigid member of a vehicle by pushing the fixedly mounted rigid member between the fingers of said rotary coupling, by sliding the piston of said rotary coupling toward the proximal position until the fixedly mounted rigid member is aligned with the notches in said rotary coupling, and by twisting said rotary coupling around its longitudinal axis to place the fixedly mounted rigid member within the notches of said rotary coupling.

18. The child restraining device of claim 17, wherein the rigid hollow cylinder has a round cross section.

19. The child restraining device of claim 17, where the external end of said piston in each of said rotary couplings includes at least one pawl block that prevents the rigid member from leaving at least one of the notches in said rotary coupling when said rotary coupling is releasably engaged with the rigid member.

20. The child restraining device of claim 17, including means for simultaneously twisting said rotary couplings.

* * * * *